Oct. 14, 1941.　　J. W. MEADOWCROFT　　2,258,858
SHEATHING
Filed March 15, 1939
FIG. 1
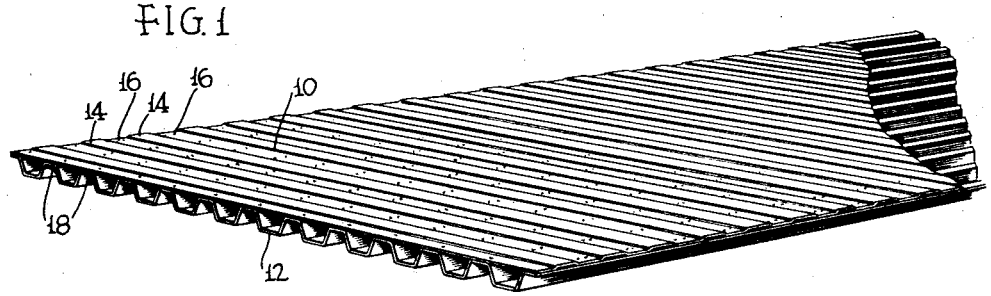
FIG. 2
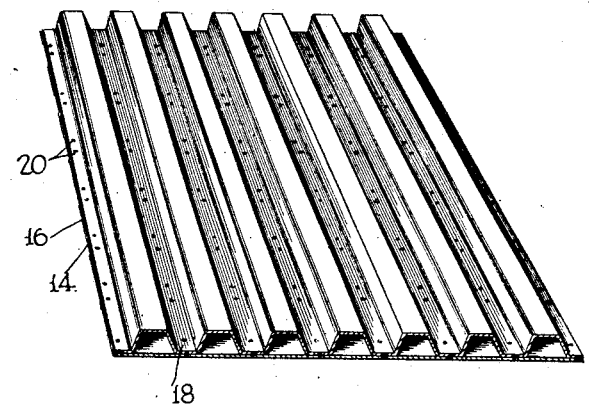
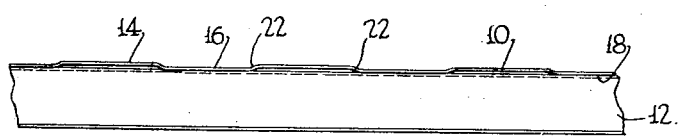
FIG. 3
INVENTOR.
Joseph W. Meadowcroft
BY John P. Tarbox
ATTORNEY.

Patented Oct. 14, 1941

2,258,858

UNITED STATES PATENT OFFICE 2,258,858

SHEATHING

Joseph W. Meadowcroft, Philadelphia, Pa., assignor to Edward G. Budd Manufacturing Company, Philadelphia, Pa., a corporation of Pennsylvania Application March 15, 1939, Serial No. 261,967

4 Claims. (Cl. 189—34)

This invention relates to a metallic skin surfacing where the same is backed by corrugated metal and the two secured together for stiffening. More particularly the invention has to do with light weight skin surfacing such as might be employed in airplane wing surfaces and other parts of aircraft.

In aircraft wing surfacing it has been the practice to combine the thin skin sheet with a corrugated backing sheet strip welded at frequent intervals to the skin. Such a structure permits the use of a thin skin member and provides considerable rigidity for the skin member. In practice, the corrugated sheet has been spot welded to the skin sheet at frequent intervals along lines extending along the skin sheet contacting loops of the corrugated sheet. In making a spot weld the metal is considerably heated and upset to some extent due to the welding temperature and, upon cooling, produces a shrinking stress, the result of which in thin sheets, is to produce considerable irregularity, waviness, wrinkling and buckling due to this stress. The thin skin member under such circumstances cannot and does not, in practice, give a smooth appearance. In order to counteract these stresses, it has been the practice to stress the skin with respect to the corrugated backing member in the direction of the corrugations, but even such practice does not avoid the tendency to wrinkle or buckle in a direction transverse to the direction of the corrugations.

The present invention is directed to a peculiar structure especially designed to produce a smooth appearing skin and which will avoid the buckled stressed appearance of the former construction, and more specifically comprises providing in the skin sheet a plurality of parallel slight offsets extending substantially transverse to the corrugated sheet.

An object of the invention is to provide a skin structure having a corrugated backing and which structure shall present a smooth surface appearance free of buckling and uneven waviness and wrinkling.

Another object of the invention is to provide a skin sheet in conjunction with a corrugated backing sheet which skin sheet is also corrugated and whose corrugations have flat loops with an amplitude of the order of the thickness of the material itself, and the pitch of which is in the order of the pitch of the corrugated backing sheet.

A further object of the invention is to provide such a structure as is set forth in the previous object in an aircraft skin surface and arranging the shallow corrugations of the skin surface so as to extend in the direction of the airflow along the surface.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claims.

In the drawing wherein similar reference characters refer to similar parts throughout the several views:

Figure 1 is a perspective exterior view of a section of the skin surfacing with a portion of the skin sheet cut away.

Figure 2 is an interior perspective view of a section of the surface structure and Figure 3 is an enlarged end elevation of a few corrugations to illustrate the structure in more detail.

Referring to Figure 1 there is shown a surface construction comprising a skin sheet 10 and a corrugated backing sheet 12. The skin sheet is provided with a plurality of parallel offset strips 14 producing shallow corrugations in the skin sheet 10. These parallel offset strips 14 have a width similar to the intervening material 16 between adjacent strips and are offset in an amount approximately equal to the thickness of the material itself. The intervening strips 16 are spot welded to the contacting loops 18 of the corrugated backing sheet 12 either by a single spot weld or by a plurality of spot welds such as 20 at each crossing of the strip portion 16 with the contacting nodes 18 of the corrugated backing sheet. Where the pitch of the offset portions is in the order of a half inch, that is, the offset strips approximately one quarter inch wide, a single spot weld may be found preferable, but where the pitch is as great as an inch, that is, the strips having a width of one half inch, two or more welds such as clearly illustrated in Figure 2 are preferable.

The offsets 22 produced in corrugating the skin sheet 10 are sufficiently closely spaced to provide a rigidity in the skin sheet against wrinkling or buckling due to the shrinkage stress of the spot welds joining the skin sheet with the corrugated backing sheet, but are insufficient to prevent the skin sheet from being flexible and capable of being formed around irregular contour members such as wing surfaces of aircraft. The offsets are also so slight as to, in effect, produce no increase in the skin resistance to air flow where the offsets are arranged in the direction of the line of flight or movement of air there across.

In practice is has been found possible to employ a skin sheet having a thickness of .006 of an inch with offsets of .006 to .020 depending upon the pitch or spacing between the offsets, and provide a surface which is substantially free of any wrinkling or buckling resulting from stresses set up by the individual spot welds. As a result of the offset construction, it is possible to employ thin sheets of the order of .006 of an inch and obtain an appearance and smoothness not otherwise possible without the use of skin sheets of considerably greater thickness and yet no increase in air skin friction results.

The offset strips in the skin sheet may be rolled or formed therein by a die, and in ordinary practice it will be found preferable to employ a corrugated backing sheet having a corrugated pitch length somewhat similar to the pitch between corrugations in the skin sheet.

There is thus provided a light skin surface structure having a corrugated backing spot welded thereto, and which skin surface presents a smooth appearance in addition to having substantially the qualities of a thin flat sheet. No difficulty is encountered in attaching such a surface to adjoining flat members, for the offsets are so slight as to permit gradual flattening of the sheet to accommodate adjoining flat surfaces.

Though a single embodiment of the invention has been illustrated and described, it is to be understood that the invention is not limited thereto but may be varied to suit various requirements. As many changes in construction and shape may be made without departing from the spirit of the invention as will be apparent to those skilled in the art, reference will be had to the appended claims for a definition of the limits of the invention.

What is claimed is:

1. A corrugated metal backed skin structure comprising a flexible skin sheet having a plurality of parallel, uniformly spaced, small offset portions, said offset portions dividing the sheet into alternate parallel substantially similar width flat strips, every other parallel strip lying in one plane and the alternate strips lying in another plane closely spaced therefrom, the distance between said planes being of the order of the thickness of said skin sheet, said offset portions having cross sectional dimensions which insure the flexibility of the skin longitudinally thereof and a corrugated metal sheet backing the skin sheet and spot welded thereto, the corrugations of the backing sheet being transverse to said offset portions.

2. A metal skin structure comprising a flexible skin sheet having a plurality of parallel, uniformly spaced, small offset portions, said offset portions dividing the sheet into alternate parallel substantially flat strips, every other parallel strip lying in one plane and the intermediate strips lying in another plane closely spaced therefrom, a backing sheet secured to said skin sheet through the strips of one of said planes, said backing sheet having means therein providing stiffness thereof in a direction substantially transverse to said offsets the spacing of said planes being substantially no greater than three and one-half times the thickness of said skin sheet.

3. A metal skin sheet structure comprising a flexible, thin gauge, metal skin sheet and a corrugated backing member, said skin sheet having a plurality of parallel, substantially uniformly spaced corrugations extending transversely of the corrugations of said backing member, the bottoms of the corrugations of said backing member being welded to the bottoms of the corrugations of said skin sheet, said skin sheet corrugations being of a height of the order of the thickness of the metal of said skin sheet and such cross-sectional shape as to permit substantially unrestrained flexing of said skin sheet, the tops of said skin sheet corrugations being flat and of a width substantially the same as the bottoms thereof.

4. A metal skin sheet structure having a flexible, metal skin sheet and metal backing means welded to said skin sheet along spaced parallel lines of securement, said skin sheet being of such thinness and character that stresses set up therein around the welds as a result of cooling after the welding operation tend to produce buckles at the regions of the welds, said sheet having a laterally offset portion disposed between and substantially parallel to adjacent lines of securement and adjacent said welds, said offset portion being of a depth not substantially greater than three and one-half times the thickness of said skin sheet whereby to counteract the said tendency toward buckling.

JOSEPH W. MEADOWCROFT.